US012469072B2

(12) United States Patent
Aviv et al.

(10) Patent No.: US 12,469,072 B2
(45) Date of Patent: *Nov. 11, 2025

(54) SYSTEM AND METHOD FOR BIDDING ON AN ASSET IN PROGRESS

(71) Applicant: Prophet Productions, LLC, New York, NY (US)

(72) Inventors: Bobby Elijah Aviv, New York, NY (US); Amy Leigh Pearson, Glenview, IL (US)

(73) Assignee: Prophet Productions, LLC, New York, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/965,442

(22) Filed: Oct. 13, 2022

(65) Prior Publication Data
US 2023/0281705 A1    Sep. 7, 2023

Related U.S. Application Data

(63) Continuation-in-part of application No. 17/684,422, filed on Mar. 2, 2022, now Pat. No. 11,481,815.

(51) Int. Cl.
*G06Q 30/06*    (2023.01)
*G06Q 30/0601*  (2023.01)
*G06Q 30/08*    (2012.01)

(52) U.S. Cl.
CPC ......... *G06Q 30/08* (2013.01); *G06Q 30/0601* (2013.01)

(58) Field of Classification Search
CPC .................. G06Q 30/0601; G06Q 30/08
(Continued)

(56) References Cited

U.S. PATENT DOCUMENTS

| 11,373,200 B2* | 6/2022 | Ahlgren | G06Q 30/0206 |
| 2010/0010935 A1* | 1/2010 | Shelton | G06Q 40/03 705/37 |

(Continued)

FOREIGN PATENT DOCUMENTS

| JP | 2020537780 A | 12/2020 | |
| WO | WO-2018222846 A1* | 12/2018 | G06F 21/10 |

(Continued)

OTHER PUBLICATIONS

Wang et al. "Display Advertising with Real-Time Bidding (RTB) and Behavioural Targeting"; Published Fri, Oct. 7, 2016 16:12:28 UTC; extracted from IP. Com on Jul. 7, 2025 (Year: 2016).*

(Continued)

*Primary Examiner* — Yogesh C Garg
(74) *Attorney, Agent, or Firm* — Amy L. Pearson

(57) ABSTRACT

The Bidding on an Asset in Progress (BAIP) system allows live, real-time bidding on a work (song, artwork, invention, story, concept, etc.) during its inception and evolution. The system captures video and/or audio of the work and/or artist during inception and creation and/or production of the work. The live performance in the auction can take place in a metaverse. Depending on how the artist/musician/creator sets up an auction, fans can bid on digital representations of versions and/or parts of the work, the recorded video and/or audio of the work being created, the physical work created, specific copyright rights, and supplemental assets associated with the work or the artist/musician/creator. Such a system enables bidding on any number of combinations of assets captured, created, or modified during one or more auctions. Fans can band together to bid on any asset and establish fractionalized ownership that is optionally governed through a DAO. After completion of the work and auction, ownership of the asset(s) is preferably transferred through NFTs (Continued)

and the winning bidder(s) receives the finished asset(s) (digital and/or physical).

38 Claims, 12 Drawing Sheets

(58) Field of Classification Search
USPC .................................................. 705/26.3
See application file for complete search history.

(56) References Cited

U.S. PATENT DOCUMENTS

| | | | |
|---|---|---|---|
| 2013/0297438 A1* | 11/2013 | Louie | G06Q 30/08 705/26.3 |
| 2015/0224406 A1* | 8/2015 | Wolgin | A63F 13/792 463/9 |
| 2021/0279695 A1 | 9/2021 | Rice | |
| 2021/0357447 A1 | 11/2021 | McKensie | |
| 2022/0035936 A1 | 2/2022 | Lin | |
| 2022/0069996 A1 | 3/2022 | Xue | |
| 2022/0075845 A1 | 3/2022 | Bowen | |
| 2022/0114600 A1 | 4/2022 | Blackburn | |
| 2022/0147988 A1 | 5/2022 | Alexa | |

FOREIGN PATENT DOCUMENTS

| | | | | |
|---|---|---|---|---|
| WO | WO-2020163790 A1 * | 8/2020 | ........... | G06Q 20/065 |
| WO | WO-2021062160 A1 | 4/2021 | | |

OTHER PUBLICATIONS

Introduction to Smart Contracts, Ethereum, https://docs.soliditylang.org/en/v0.8.17/introduction-to-smart-contracts.html.
GeoTono, The Z/Yen Group of Companies, https://www.geognomo.com/geognomo/geotono/.
Lee, In-Hyeok, Music copyright trading platform Musicow revitalizes Korea's startup scene, The Korea Economic Daily, Nov. 22, 2021, https://www.kedglobal.com/newsView/ked202111220003.
Grincalatis, Merunas, Can a Smart Contract be upgraded/modified? Is CPU mining even worth the Ether? The Top questions answered here . . . , Feb. 6, 2018, Medium, https://medium.com/ethereum-developers/can-a-smart-contract-be-upgraded-modified-1393e9b507a.
P, Hugo, Physical NFT Art, or physical Art NFT?, Jun. 21, 2021, https://nonfungible.com/blog/physical-nft-art-or-physical-art-nft.
Understanding NFTs, Oct. 29, 2021, Ingram Yuzek Gainen Carroll & Bertolotti, LLP, https://www.jdsupra.com/legalnews/understanding-nfts-3254600/.
Levine, Jason, How NFTs will Disrupt the Music Industry, Dec. 19, 2021, The Yeshiva University Observer, https://yuobserver.org/2021/12/how-nfts-will-disrupt-the-music-industry/.
Fuchs, Alexandra. NFTs and Copyright Law, Feb. 10, 2022, Harness IP, https://www.jdsupra.com/legalnews/nfts-and-copyright-law-7361836/.
Chaparro, a16z, The Chainsmokers back 3LAU's NFT platform Royal in $55 million Series A, Frank, Nov. 22, 2021, https://www.theblockcrypto.com/linked/125056/a16z-the-chainsmokers-back-3laus-nft-platform-royal-in-55-million-series-a.
How does it work?, Royal Markets Inc., https://web.archive.org/web/20220301031726/https://royal.io/.
17 U.S.C. § 101.
Zhao, Sijia, BMCProtector: A Blockchain and Smart Contract Based Application for Music Copyright Protection, Dec. 10, 2018, ICBTA 2018: Proceedings of the 2018 International Conference on Blockchain Technology and Application.
Wilser, Jeff, The Social (Token) Network: Rally, Friends With Benefits and the Future of Branding, Nov. 9, 2021, https://www.coindesk.com/business/2021/11/09/the-social-token-network-rally-friends-with-benefits-and-the-future-of-branding/.
Ravi, Reethu, What is a DAO and How Does It Relate to NFTs?, Jan. 20, 2022, NFT Evening, https://nftevening.com/what-is-a-dao-and-how-does-it-relate-to-nfts/.
Water & Music $Stream Season 1, Defining music NFT ownership, from the digital to the analog world, Dec. 14, 2021, Water & Music, https://www.waterandmusic.com/defining-music-nft-ownership-from-the-digital-to-the-analog-world/.
Transparency and Money Flows in the Music Industry, Oct. 2019, Rethink Music, https://creativepassport.net/wp-content/uploads/2019/10/Fair-Music-Transparency-and-Payment-Flows-in-the-Music-Industry.pdf.
Trisha, How Do NFT Copyrights Work?, Aug. 27, 2021, Mintable, https://editorial.mintable.app/2021/08/27/how-do-nft-copyrights-work/.
Royal Markets Inc., https://royal.io/.
17 U.S.C. § 106.
"Web 3, the Internet Revolution"; Dec. 21, 2021; translated by Content Engine LLC; Publication: CE Noticias Financieras, English ed. [Miami] Dec. 21, 2021.

* cited by examiner

```
┌─────────────────────────────────────────┐
│  Select NFT to sell from connected wallet│
└─────────────────────────────────────────┘

┌─────────────────────────────────────────┐
│          Set pricing parameters          │
└─────────────────────────────────────────┘

┌─────────────────────────────────────────┐
│          Set auction parameters          │
└─────────────────────────────────────────┘

┌─────────────────────────────────────────┐
│               Pay gas fee                │
└─────────────────────────────────────────┘

┌─────────────────────────────────────────┐
│              Start Auction               │
└─────────────────────────────────────────┘

┌─────────────────────────────────────────┐
│               End Auction                │
└─────────────────────────────────────────┘

┌─────────────────────────────────────────┐
│  Transfer ownership of NFT via blockchain│
└─────────────────────────────────────────┘
```

(PRIOR ART)

FIG. 1

Create Assets

Asset 1: Limited copyright, MP3/WAV, LOGICX file, MP4 files of video feeds 1-4

Asset 2: Zoom session with Musician

Asset 3: 2 Backstage passes for event on January 30, 2022 at Madison Square Garden Add Asset   Next

Edit Asset 1

Sub-Asset 1: Limited Copyright    [Modified © smart contract code]
Description: Full copyright ownership of song created during auction (the right to reproduce the work, prepare derivative works, distribute copies, to display the work publicly, and to perform the work publicly), with no right to associate with cigarettes

Sub-Asset 2: Song MP3/WAV    [Standard mp3 smart contract code]
Filetype: MP3/WAV   Source: Upload immediately after auction

Sub-Asset 3: LOGICX File    [Standard file smart contract code]
Description: Full LOGICX file as it exists at the end of the auction.
Filetype: LOGICX   Source: Upload immediately after auction

Sub-Asset 4: Video Feed MP4 Files    [Standard mp4 smart contract code]
Description: MP4 files of all performance video feed(s)
Filetype: MP4   Source: Automatically recorded during auction
Number of files: 4

Add Sub-Asset   Next

FIG. 7b

```
Song .mp3
    ■ Exclusivity
        ☑ Non-exclusive
        ▦ Exclusive
    ▦ Transferability
        ☑ Non-transferrable
        ▦ Transferable
    ☑ Personal
    ☐ Copyright Rights
        ☐ To reproduce the work
        ☐ To prepare derivative works
        ☐ To distribute copies
        ☐ To display the work publicly
        ☐ To perform the work publicly
```

Asset In Progress .mp4 Video — 800
- ■ Exclusivity
  - ▨ Non-exclusive
  - ☑ Exclusive
- ■ Transferability
  - ▨ Non-transferrable
  - ☑ Transferable — 801
    - ☐ Right to collect a percentage when transferred/sold
- ☐ Personal
- ▨ Copyright Rights (Use)
  - ☑ To reproduce the work
  - ☑ To prepare derivative works
  - ☑ To distribute copies
  - ▨ To display (show) the work publicly
    - ☑ Except a non-exclusive, non-transferrable, personal right for the asset creator to publicly post this video to social media platform with the right to collect any associated royalties
    - ☑ Except a non-exclusive, non-transferrable, personal right for this bidding platform to publicly display this video
  - ☑ To perform the work publicly

Song Copyright
- ■ Exclusivity
  - ☐ Non-exclusive
  - ☑ Exclusive
- ■ Transferability
  - ☐ Non-transferrable
  - ☑ Transferable
- ☐ Personal
- ▨ Copyright Rights
  - ☑ To reproduce the work
  - ▨ To prepare derivative works
    - ☑ Except the right to prepare derivative works associated with cigarettes
  - ☑ To distribute copies
  - ▨ To display the work publicly
    - ☑ Except the right to display the work publicly in association with the sale or use of cigarettes
  - ▨ To perform the work publicly
    - ☑ Except the right to perform the work publicly in association with the sale, advertisement, or use of cigarettes

FIG. 8c

SYSTEM AND METHOD FOR BIDDING ON AN ASSET IN PROGRESS

BACKGROUND OF THE INVENTION

Record labels have a history of taking advantage of young artists with large upfront payments to mask the unbalanced deal they are usually signing. Non-fungible tokens (NFTs) may offer a new way for artists to change the dynamic and keep more of their earnings.

A standard record deal begins by providing an initial signing bonus and paying for recording, marketing and touring. The record label usually gives the artist a very small percentage of the revenue from album sales and a much smaller percentage from streams (as a royalty payment), only after reimbursing the record label for its upfront costs. In return, the record label gets the majority of revenues, and, typically, full rights to the master recordings.

Because whoever pays for the recordings often owns the master recordings, ownership of the masters has become one of the most controversial aspects of a recording contract. The owner of a master recording has full rights to sell, license, and reproduce the music of the master recording. The owner of the master recording also may have the right to prevent others from using it, including the original artist who made the master recording itself.

An NFT is digital representation of a real, unique asset with proof of ownership/title stored in a digitally distributed, decentralized, immutable, oftentimes public digital ledger (a blockchain). Blockchains are fundamentally ledgers containing a history of transactions. The ledger is immutable due to the cryptography employed to construct the chain.

The transactions stored in the blockchain result from the execution of contracts. Contracts may be simple, such as the exchange of value logged on the Bitcoin blockchain, or they can be complex. Complex transactions are the result of executing smart contracts, which can be compared to applications, but run within the blockchain.

Both fungible and non-fungible tokens are built and reside on blockchain technology. Blockchain technology was initially created to support cryptocurrency to eliminate intermediaries and establish trustless transactions. Cryptocurrency such as Bitcoin and Ether are fungible—meaning each Ether has the same value as any other Ether at any given moment, like a dollar bill. For example, one Bitcoin has the same value as another Bitcoin. NFTs, however, are non-fungible—meaning that each token is unique and has a unique identification code ("TokenID") and other metadata that distinguish one from another. This helps give NFTs the attributes of originality, scarcity, and provenance.

NFTs are written with software code (called smart contracts) that governs actions such as verifying ownership and managing the transferability. NFTs can be programmed beyond the basics of ownership and transferability. Common use cases for NFTs include tracking ownership of popular GIFs, works of visual or sonic art, and also tangible items, such as sports trading cards or any particular goods for which there is sufficient value and scarcity to warrant tracking their ownership on the blockchain.

NFTs are currently mostly used for selling art and music. NFTs contain a description of the asset and provide a link to the asset.

NFTs can also be digital representations of physical assets. For example, an NFT can be created for a physical piece of art and can be sold along with the physical piece of art. The metadata associated with an NFT's smart contract can include all of the details of the physical piece of art such as the materials used (e.g., acrylic and spray on 100% cotton canvas), the size (e.g., 120 cm×100 cm×2 cm), sales/ownership/location history, as well as whether the creator will receive a royalty from all future sales of the NFT.

NFTs comprise a cryptographic hash, a unique string of letters and numbers that is related to or representative of a specific asset.

Marketplaces (NFT exchanges) for these virtual goods have also become commonplace, such as OpenSea, Nifty Gateway, Rarible and SuperRare. Websites such as Flipkick.io offer artists and art holders ways to monetize physical NFTs.

NFTs offer artists the opportunity to crowdfund their careers while retaining copyright ownership of their artwork/music while rewarding early supporters. For example, artists can release a limited number of NFT collectibles to their fan base for $10-20 each. This collectible could include album artwork, a copy of the album, or a t-shirt. By selling these NFT collectibles, money can be raised to invest in recording and marketing by an unsigned recording artist. There is no need to sell the master recordings. Instead, the fans/public become the record label, and the artists retain all their rights.

Furthermore, artist-to-fan distribution strengthens fan support. Instead of streaming on Spotify or buying a concert ticket from Live Nation, a fan can purchase a song or concert ticket directly from their favorite artist via an NFT. The artist can also capitalize on this direct connection by including access tokens in a few random (e.g., lottery) or specific NFTs. These tokens could grant access to a private Zoom or Discord chat with the artist, VIP concert tickets, an in-person meet-and-greet, rare songs/samples, merchandise discounts, exclusive perks, band after-party invitations, or never released band videos. This offers an additional incentive for fans to invest and could generate a lucrative secondary market—on other NFT platforms. Record labels thrive by finding the next big artist early, but now, through NFTs, this role is transferred to fans. NFTs can incentivize music consumers to find new artists to invest in and promote. Since the investors are also consumers, the NFT sale is a form of marketing itself.

A valuable aspect of NFT technology is the ability to include an ongoing royalty clause (such as royalty clause option 801 shown in FIG. 8*b*) for the original artist/creator in the NFT code (smart contract) specifying that they will receive a set percentage of each future sale of the NFT. Entities such as SoundExchange and Audiam are trying to automate royalty collection for digital audio transfers.

Another aspect of selling creative works such as art or music using NFTs is determining whether or not to transfer the copyright (or certain specific rights of the copyright) in the sale of the NFT. Ownership of a copyright provides exclusive rights to the owner under 17 U.S.C. § 106—the right to reproduce the work, prepare derivative works, distribute copies, to display the work publicly, and to perform the work publicly (such rights, "use rights;" the ability to monetize such rights, the "monetization rights").

Creation of an NFT can be categorized as a copy or even a derivative of the original work ("a work based upon one or more preexisting works" such as an "art reproduction . . . or any other form in which a work may be recast, transformed, or adapted."). 17 U.S.C. § 101. In other words, under U.S. copyright law, the copyright holder (absent a license to, for example, to make derivative works or make all NFTs for the copyrighted work) is and should be the only one with the authority to transform the original work into an NFT.

Most NFTs are now part of the Ethereum blockchain. Ether is a cryptocurrency, like Bitcoin or Dogecoin, but its blockchain, Ethereum, also supports NFTs, which store extra information that makes them work differently from a fungible token. Gas refers to the unit that measures the amount of computational effort required to execute specific operations on the Ethereum network. Since each Ethereum transaction requires computational resources to execute, each transaction requires a fee. Gas refers to the fee required to conduct a transaction on the Ethereum blockchain. Gas is required to mint, buy, or sell an NFT on a blockchain platform. Gas prices are denoted by a unit of Gwei which itself is a denomination of ETH—each Gwei is equal to $10^{-9}$ ETH (the smallest unit of ETH). The gas fee associated with transacting in ETH is a variable rate based on many factors including the amount of traffic on the network and the computation power taken to execute a transaction.

Fractional ownership of digital assets (a percentage interest in the asset) is quickly becoming popular. Many websites offering fractional ownership are likely not following securities laws. From a legal perspective, transactions considered "investment contracts" are securities. Investment contracts require (i) an investment of money; (ii) in a common enterprise; (iii) with an expectation of profits to be derived solely from the efforts of others. In order to provide investors with confidence in selecting securities in which to invest, a full and fair disclosure of the security is required. Thus, in order to offer shares in an asset such as art or music and comply with securities laws, the platforms must provide potential investors and the Securities and Exchange Commission (SEC), in a registration statement, with sufficient information about the asset creator, the present value of the asset to be sold, the provenance of the asset, and fractional ownership of the asset to be sold so that the investors can make an informed investment decision. The SEC reviews whether the registration statement includes all the material facts for investment.

Because it has not yet been contemplated, there is no guidance on selling fractional ownership of an asset in progress—or an asset before it has been created. However, the intent of the securities laws is still relevant. Recently a Decentralized Autonomous Organization (DAO) called Spice DAO bought a rare copy of a book detailing director Alejandro Jodorowsky's efforts to produce an ambitious adaptation of Frank Herbert's science fiction novel *Dune*. After spending $3 million on it at Christies' Paris, the group planned to splice and sell the book as NFTs before burning the physical copy. (The book's high estimate was just under $40,000.) There was just one problem: they did not realize that purchasing the book did not actually grant them ownership of the copyright (including the right to make derivative works), which is what would actually enable them to produce the NFTs. Thus, it is important that the seller be transparent and fully disclose the rights, or lack thereof, being transferred.

As the blockchain industry continues to flourish, NFTs have enormous potential to change how creative careers are started and how asset creators are paid. Typically, music and art are sold as completed products. As one way to give value to an NFT and/or a physical work, the NonFungible.com blog suggests that the artist can sell different completed stages of the content's progression. However, there is no way to bid on a work during its creation.

BRIEF SUMMARY OF THE INVENTION

The Bidding on an Asset in Progress (BAIP) system allows live, real-time bidding on a work (song, artwork, invention, story, concept, etc.) during its inception and evolution. After completion of the work and auction, the winning bidder(s) receives the finished asset(s) (digital and/or physical). The system captures video and/or audio of the work and/or artist during inception and creation and/or production of the work. Such a system enables bidding on any number of combinations of assets captured, created, or modified during one or more auctions as well as other related goods and services described herein.

Depending on how the artist/musician/creator sets up an auction, fans can bid on digital representations of versions and/or parts of the work, the recorded video and/or audio of the work being created, the physical work created, copyright rights, and supplemental assets associated with the work or the artist. Ownership of these assets can be transferred (i) by minting the assets as NFTs which are transferred to the digital wallet(s) of the winner(s); or (ii) by traditional contract, or (iii) in other ways where ownership is lawfully passed from the owner to a purchaser.

BRIEF DESCRIPTION OF THE DRAWINGS

Illustrated in the accompanying drawing(s) are embodiments of the present invention in such drawings:

FIG. 1 shows an example of the prior art process for selling a pre-existing work on a standard NFT platform;

FIG. 7*a* shows the creation of assets on the BAIP platform with a limited copyright and a modified copyright smart contract code button;

FIG. 7*b* shows the creation of the sub-assets that make up an asset shown in FIG. 7*a;*

FIG. 8*a* shows a user interface containing a menu of copyright rights to be granted or retained in an NFT for a song .mp3 file;

FIG. 8*b* shows a user interface containing a menu of copyright rights to be granted or retained in an NFT for an .mp4 video file;

FIG. 8*c* shows a user interface containing a menu of copyright rights to be granted or retained in an NFT for a song copyright;

The above-described figures illustrate the described apparatus and its method of use in several preferred embodiments, which are further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

DETAILED DESCRIPTION OF THE INVENTION

Figure 2:
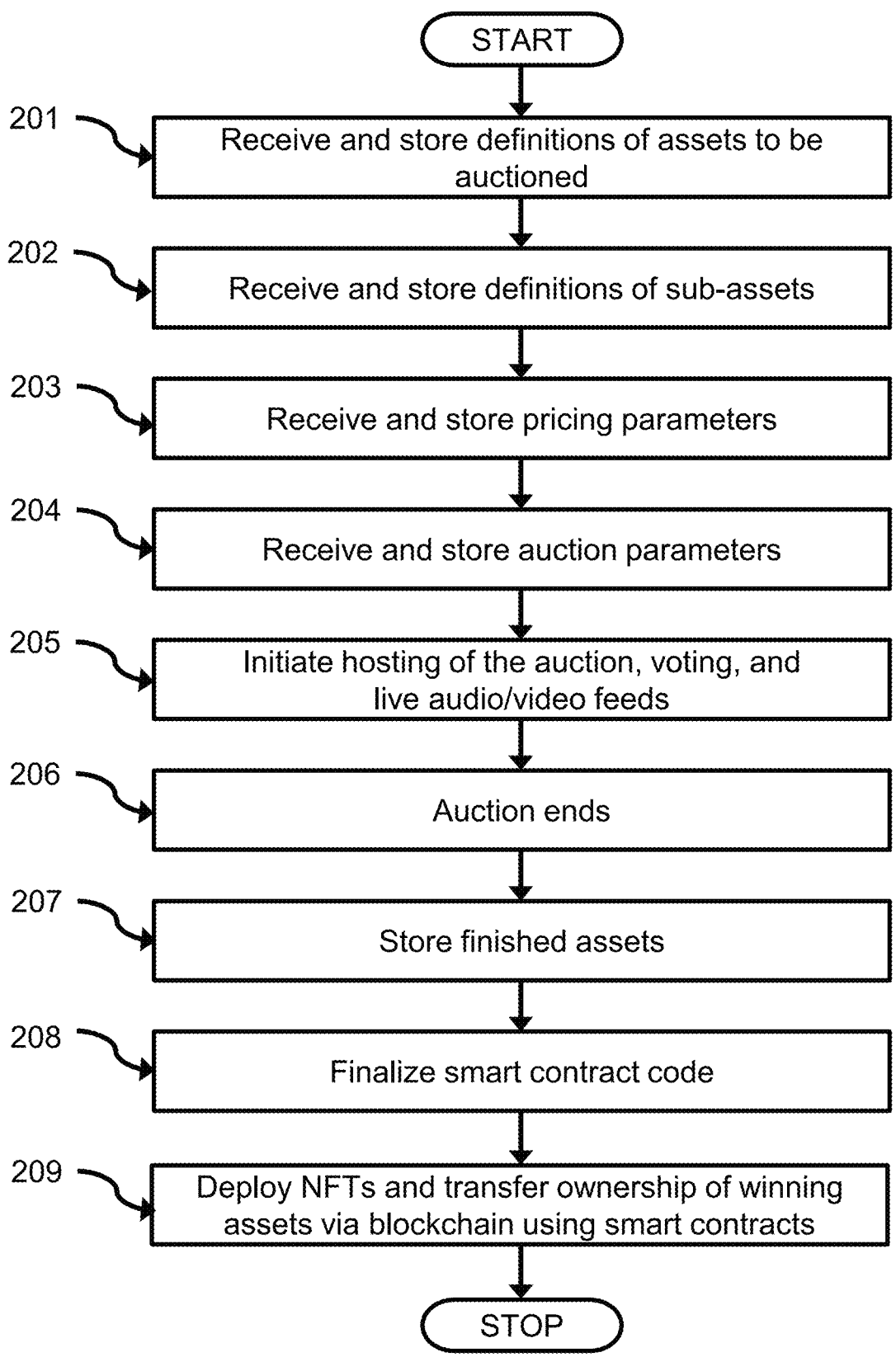
FIG. 2 shows the process of creating an auction for and auctioning an asset in progress and transferring a finished asset using the present invention.
Figure 3:
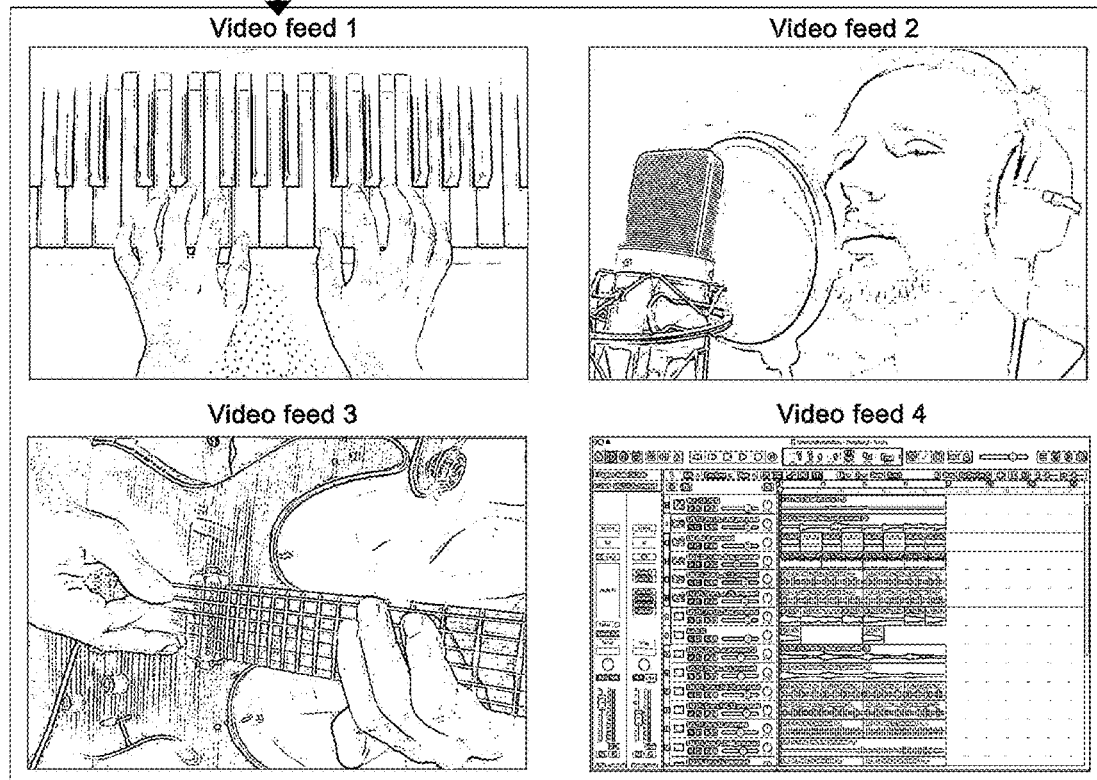
FIG. 3 shows an example of a live auction for a musical asset in progress and two supplemental assets from the musician.
Figure 4:
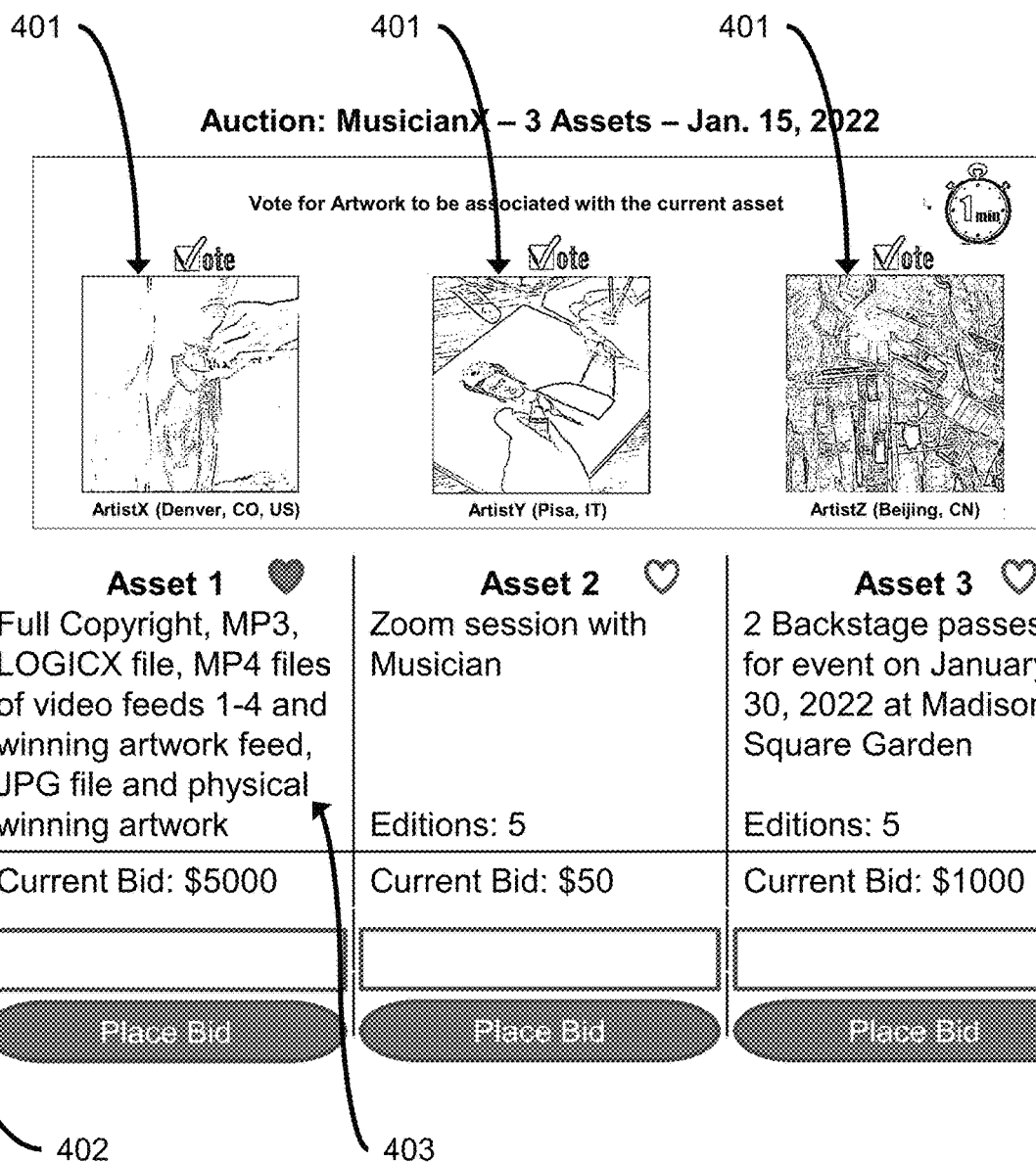
FIG. 4 shows (a) live streams of three artists creating different artworks to be potentially associated with the musical asset in progress shown in FIG. 3 upon completion of the musical asset in progress; and (b) a voting mechanism for selecting a winner between the three different artworks.
Figure 5:
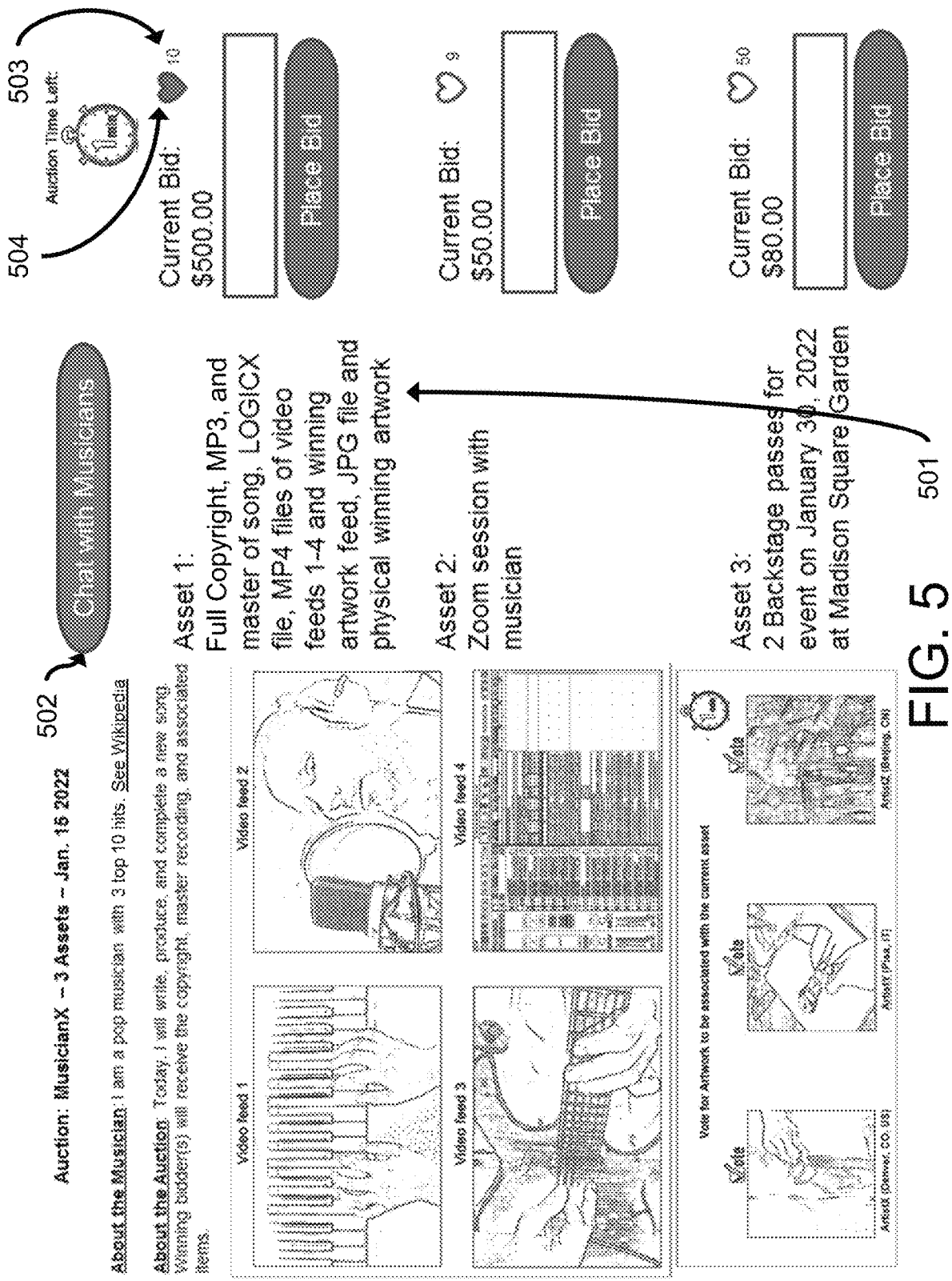
FIG. 5 shows a combination of FIG. 3 and FIG. 4.
Figure 6A:
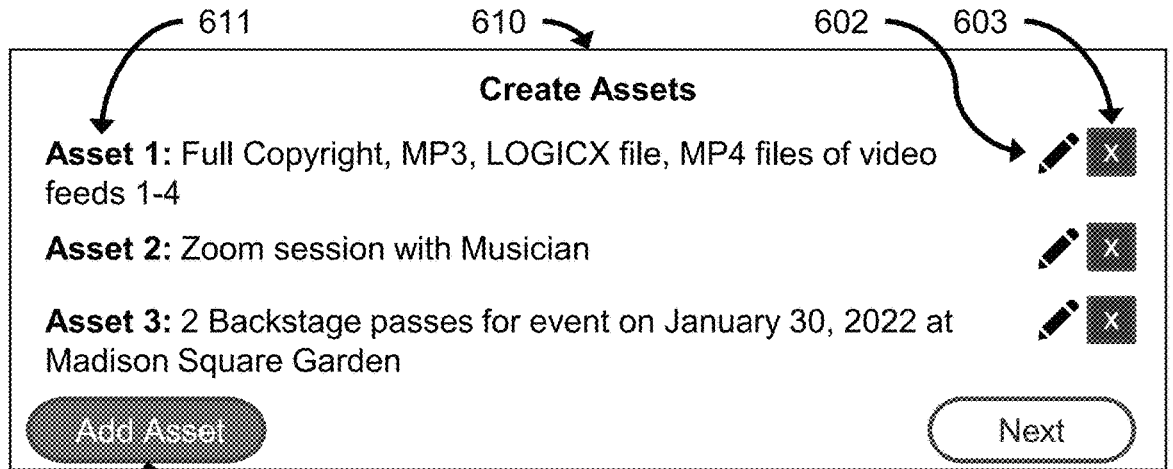
FIG. 6*a* shows the creation of assets on the BAIP platform.
Figure 6B:
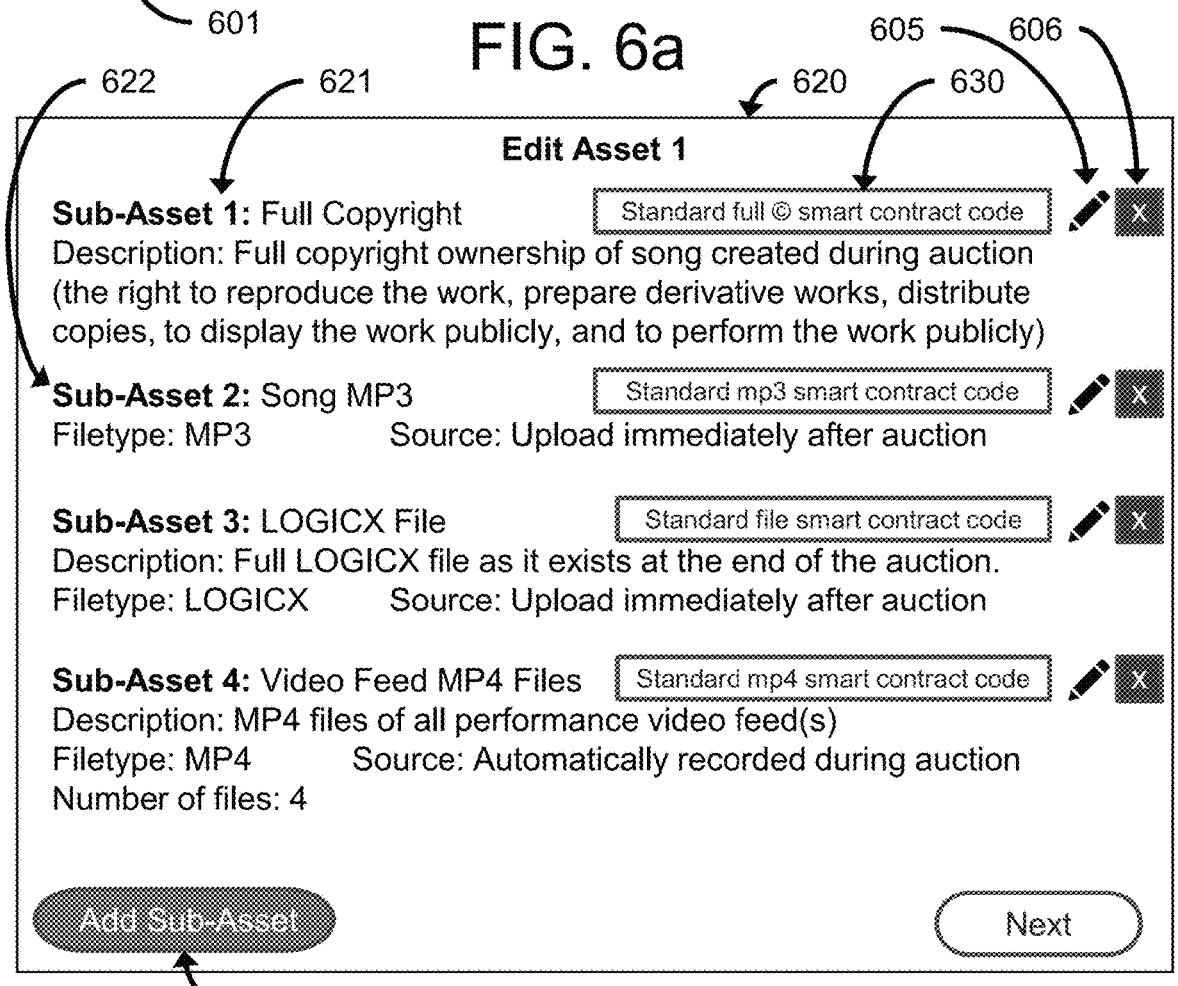
FIG. 6*b* shows the creation of the sub-assets that make up an asset shown in FIG. 6*a;*
Figure 10:
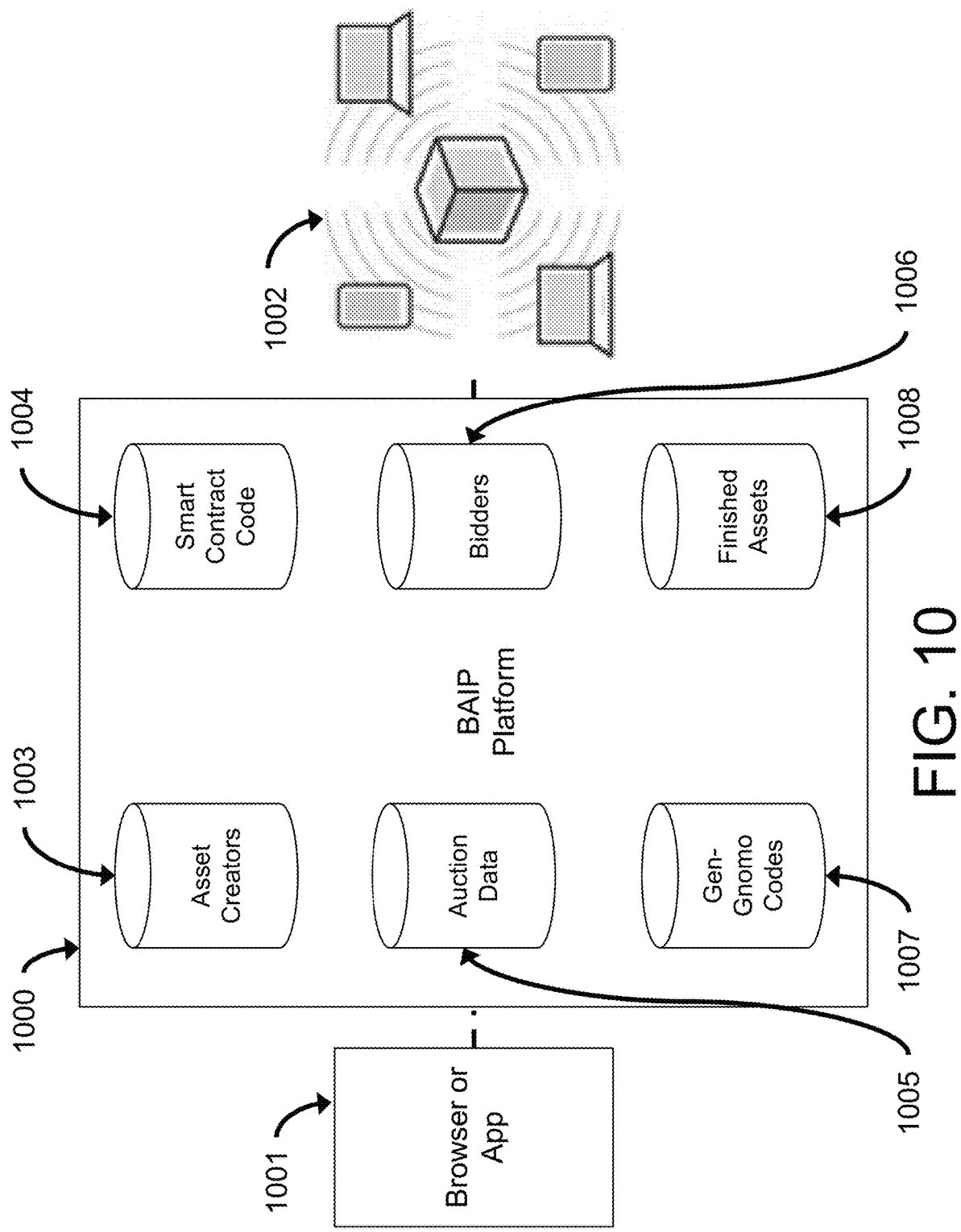
FIG. 10 shows the internal structure of the BAIP system.

FIG. 2 shows the process of creating an auction for and auctioning an asset in progress and transferring a finished asset using the present invention. At step 201, the asset creator uses the BAIP platform to define one or more assets that will be created and auctioned. As shown in FIG. 3, FIG. 4, and FIG. 5, each asset 301 is comprised of one or more sub-assets 302 which are grouped together so that the bidder can bid on a collection of assets with one bid. The definitions of assets and sub-assets are associated with the assets and sub-assets and are stored in the auction data database 1005 as shown in FIG. 10. As shown in FIG. 6a, assets such as Asset 1 611 are defined first in the "Create Assets" user interface 610. Assets are added by clicking the Add Asset button 601. Assets can be edited by clicking the edit button 602 next to each asset. Assets can be removed by clicking the "X" button 603 next to each asset. The definition of sub-assets is shown in FIG. 6b and will be explained further below.

As partially shown in FIG. 3, examples of assets (and sub-assets) include: (i) video and/or audio files (e.g., .mov, .avi, .mp4, .raw) from the live video and/or audio feed(s); (ii) digital image(s) (e.g., .jpg, .png); (iii) digital song(s) (e.g., .mp3, .wav, .aiff); (iv) text; (v) physical piece(s) of art; (vi) full or partial copyright rights for any of the above; and (vii) music software project files (e.g., LogicX project file).

An asset can also include a complete performance (such as a full song or a full concert) or a section of a performance (such as a section of a song or a section of a concert). Examples of sections of a performance include: (i) just the chorus; (ii) just a bass track; (iii) or just a portion (such as a chorus) of the original project file such as a LogicX project file.

As another example, the asset could be one of a set of 10-second portions of a full song. Each 10-second portion of the song can be a single distinctive asset. In this way, fractionalized ownership of the song is created, potentially without invoking securities laws. In this situation, the smart contract for each of the 10-second portions would at least give each of the owners a right to receive royalties for their fractionalized ownership share, but would require that if any one of the owners wanted to exercise their use rights, they would have the ability to play/perform/use the whole song.

As another example, an asset might have a limited number of editions/mintings (e.g., five uniquely numbered NFTs 303) that could be auctioned.

In one embodiment, the auction can be for assets created during a musical improvisation session. As the musician is improvising, the bidder can take note of sections of the performance in which the bidder has interest by clicking on a button on the screen (not shown) or on the keyboard to denote a specific point or points in time. For example, the bidder could indicate that he is interested in the section between 0:57-2:12. The asset creator could then create an asset for just that particular section of music or could decide to create the asset for a smaller or larger section of the performance—including the whole performance. An online tool such as the TwistedWave API can be integrated into the BAIP platform and can be used to crop an audio file.

Popular music is commonly associated with artwork such as an album cover or an image from a song's music video. In one embodiment, during the live auction, artwork to be associated with the finished asset of the song can be created on the spot (and shown in a video feed) by one or more artists. In another embodiment as shown in FIG. 4, voting can occur between multiple live artwork creations 401 such that the winning artist's piece will be associated with the resulting music recording assets (NFT, .mp3 file). A musician can select one or more artists to participate in the asset creation and set a fixed fee or predetermined percentage of the final auction price (and any associated royalties) that will go to the winning artist. A picture or digital representation of the winning asset (e.g., a .jpg file 402) can be uploaded by the artist after the auction. The physical asset 403 can be sent to the winning bidder. A supplemental auction or separate auction can be created to auction assets associated with the losing artwork (as further explained below). In one embodiment, the musician can reject the winning art (and remove it as an asset) for any reason, for example, for moral or ethical reasons, and either: (i) choose among the other art works created to be associated with the musician's asset; or (ii) use the second place art.

Other assets can include: (i) an in-person meet & greet with the asset creator; (ii) a meet & greet with the asset creator over the internet (e.g., a Zoom video call); (iii) a music lesson (instrument or voice); (iv) a production session to produce a song; (v) a custom arrangement of a song; (vi) a live in-person concert; (vii) a live web concert; (viii) backstage passes for an event; (ix) assets related to the losing artwork from the original auction; and/or (x) a social token (as explained below). Assets can also include other traditional artist-to-fan promotional items (as described above).

The BAIP platform can also be a market for social tokens. Social tokens are fungible. As an example, Artist A has 10,000 fans. Instead of asking fans to pay to subscribe to Artist A's YouTube channel (letting YouTube take 30% of Artist A's revenue), Artist A asks his fans to buy $ARTA tokens on a social coin minting website similar to Rally.io. Artist A then creates a buzz by (i) giving $ARTA tokens out to Artist A's most loyal fans; (ii) creating more community benefits for token holders (private Zoom call, merchandise discounts, exclusive perks, etc.); and/or (iii) adding the social token to an exchange so that people can trade it with other tokens (e.g., ETH). In one embodiment, a musician that initially auctioned 50 NFT editions of an MP3 of a new song, can include a social token in the NFT. This can enable the musician to add additional assets/value to the NFT and reward early supporters either by including set perks in the social token upfront or creating a Distributed Autonomous Organization (explained later) to hold and distribute existing and future assets. For example, if the 50 MP3 NFTs were auctioned before the musician was popular and the musician included in the NFT a social token (e.g., $ARTA), the musician can later reward those early supporters who bought the 50 NFT MP3s with backstage passes to a concert through the social token.

As shown in FIG. 2, at step 202, the asset creator next defines sub-assets to be included in the assets. Sub-assets are defined in the "Edit Asset" user interface 620. Sub-assets are added by clicking the add sub-asset button 604. Sub-assets can be edited by clicking the edit button 605 next to each sub-asset. Sub-assets can be removed by clicking the "X" button 606 next to each sub-asset. For example, as shown in FIG. 6b, Asset 1 611 is comprised of four sub-assets: a full copyright 621, an .mp3 file 622, a LogicX project file, and 4 video feeds. FIG. 6b shows how the four sub-assets listed above are added Asset 1 611.

Each sub-asset has its own automatically-generated smart contract code which is or can be customized for each sub-asset. For assets such as an .mp3 file (Sub-Asset 2 622), the smart contract code can be platform-standard code, meaning that the rights will be standard rights typically associated with purchasing an .mp3 file (personal, non-commercial rights). This gives the buyer confidence in the smart contract terms. This fact, that platform-standard MP3 code is used, is shown in the label of the "Full Copyright" smart contract button 630 which states that it is the "Standard Full© smart contract code." In one embodiment, when the user clicks on the "Standard Full© smart contract button" 630, the Solidity code will be shown to the asset creator. On one side of the display will be the Solidity code, on the other side of the display will be the plain language interpretation. In one embodiment, the plain language interpretation can be shown as an un-editable menu of copyright rights (explained further below) such as what is shown in FIG. 8a.

When a platform-standard smart contract code is modified for a particular sub-asset (before the smart contract is minted), the BAIP platform will show that the code is no longer "platform-standard" by changing the label of the smart contract button. As shown in FIGS. 6b and 7b, the Full Copyright Sub-Asset 1 621 was changed to limit the association of the song with cigarettes as shown in Sub-Asset 1 721. The title of Sub-Asset 1 change from "Full Copyright" to became a "Limited Copyright." The label of the smart contract code button went from "Standard Full© smart contract code" 630 to "Modified© smart contract code" 730. In one embodiment, clicking on the smart contract code button 730, brings up a window (with or without editable code) that shows the actual Solidity (or other) code that will be used to create the smart contract. In one embodiment, modifications to platform-standard code can be shown similar to the "Track Changes" feature (red-lining) in Microsoft Word (or similar to the "Track Changes" feature of Microsoft Visual Studio) when the asset creator clicks on the smart contract code button 730. For uncommon sub-assets such as a .LogicX file that may not have a standard pre-written smart contract code, the asset creator can use a generic platform-standard "file" smart contract code that codifies the asset transfer of a copy of the specified (.LogicX) file to the winning bidder with or without partial or full copyright rights. Thus, the asset creator can give the bidders proof of the asset (NFT) parameters (such as fully defined copyright rights). The code containing the ownership rights and transferability will be public and un-editable once the auction begins.

The rights conferred to the musician/artist creating a work through copyright under 17 U.S.C. § 106 include the rights to: reproduce the work, prepare derivative works, distribute copies, display the work publicly, and perform the work publicly. When a song is created on the BAIP platform (and the musician has no existing contractual obligations to third parties), the musician owns and controls all of the copyright rights for that song. The musician can keep or sell away any or all copyright rights and control how the song can be used in the future. As an example, the musician can limit the scope of the copyright grant of a video stream—restricting the ability of the video from being used to promote certain products or withholding all commercial rights.

Historically, a song in the form of an .mp3 file is sold to end-users as a non-exclusive, non-transferable right to use the .mp3 file only for personal, non-commercial purposes. The end-user has no rights to redistribute, transmit, assign, sell, broadcast, rent, share, lend, repurpose, modify, adapt, edit, license or otherwise transfer, the .mp3 file. The end-user is not granted any synchronization, public performance, public display, promotional use, commercial sale, resale, reproduction, or distribution rights. A platform-standard MP3 smart contract for an MP3 asset such as Sub-Asset 2 622 shown in FIG. 6b would contain code to that effect. In addition to being shown in Solidity, a smart contract programming code, it would also be displayed in plain English for non-technical bidders in language such as shown in this paragraph or as an unchangeable (after the auction starts) menu of copyright rights (explained further below) such what is shown in FIG. 8a.

A user interface can be created to make the selection and modification of these rights easy for the asset creator. In one embodiment, as shown in FIG. 8a, FIG. 8b, and FIG. 8c, a hierarchical list of checkboxes (menu of copyright rights 800) indicates which rights were granted, not granted, or modified. At the top level would be the right to (i) reproduce the work; (ii) prepare derivative works; (iii) distribute copies; (iv) display the work publicly; and (v) perform the work publicly. The full copyright grant 621 as shown in FIG. 6a and FIG. 6b would have each of these checkboxes checked. NFTs can be made for rights given and rights retained.

A smart contract for a traditional song in the form of an .mp3 file as explained in the preceding paragraph could be created using a menu of copyright rights 800 such as shown in FIG. 8a—granting a non-exclusive, non-transferrable, personal right to use the .mp3 file with no copyright rights transferred.

As another example, if an asset creator created a live video feed such as Video Feed 1 304 in FIG. 3, the asset creator could use the menu of copyright rights to create a smart contract for that asset. As shown in FIG. 8b, the menu of copyright rights 800 shows rights for an exclusive, transferrable .mp4 video file including all copyright rights except: (i) a non-exclusive, non-transferrable, personal right for the asset creator to publicly post this video to social media platform with the right to collect any associated royalties; and (ii) a non-exclusive, non-transferrable, personal right for this bidding platform to publicly display this video. Up to three NFTs could be made: (a) for the winning bidder, an exclusive, transferrable MP4 video feed asset with all copyright rights except (i) and (ii) above; (b) for the asset creator, just (i) above; (c) for the BAIP platform, just (ii) above.

As another example, if the asset creator created a Limited Copyright asset such as that shown in FIG. 7b Sub-Asset 1 721, the asset creator could use the menu of copyright rights to create a smart contract for that asset. As shown in FIG. 8c, the menu of copyright rights 800 shows rights for an exclusive, transferable, copyright with all rights except (i) the right to prepare derivative works associated with cigarettes; (ii) the right to display the work publicly in association with the sale or use of cigarettes; and (iii) the right to perform the work publicly in association with the sale, advertisement, or use of cigarettes.

A few examples of retained rights by the creator may include:
- the right to receive a percentage of each future sale of any particular NFT;
- the ability to make and sell copies of the asset with profits going to education or charity; and
- the ability to make derivative works of the original asset in progress video (e.g., the ability to edit the video to make it presentable on video platforms such as YouTube).

In the future, video platforms (such as YouTube) or audio platforms (such as SoundCloud) may be able to read the NFT associated metadata to verify ownership when uploading or linking a video or audio file and thus prevent copyright infringement.

In one embodiment, a code such as that generated by GeoGnomo, can be used to represent a melody. GeoGnomo generates quaternary codes, a series of numbers representing a location with an arbitrary accuracy. From these codes, GeoGnomo generates a musical score (GeoTono) which can be reversed to retrieve the original quaternary coordinates. The code can become part of the NFT metadata and can be used to mathematically represent a melody. A comparison of the code created to represent a new melody could be used to detect copyright infringement when compared to a GeoGnomo code associated with an existing song. A machine learning algorithm ("Melody ML") could be taught to detect similar melodies. In one embodiment, after the auction, the NFT could be held in escrow for a confirmation period while the GeoGnomo code for the finished song asset is verified not to infringe upon GeoGnomo code for preexisting copyrighted works. In one embodiment, the comparison occurs during the asset creation and only the asset creator can see the real-time result of the comparison with a warning indicator to check and possibly modify the flagged melodic portion.

In one embodiment, a chat window would enable auction participants to converse during the auction. The auction participants may point out in real time any similarities to existing music, helping the participants to be able to valuate the asset. While this would be distracting to the musician creating the asset, it could also enable the musician to see and potentially agree with the assessment that the asset-in-progress song is actually similar to an existing song. The musician could then change the song or end the auction.

Due to the improvisational nature of song creation, the musician, while creating and developing an asset, might inadvertently create material very similar to either (i) a copyright owned by another person; or (ii) an earlier-made copyright owned by the musician. This material may or may not appear in the finished song asset. Like traditional contracts, smart contracts can be used to reduce risk on the musician using contract concepts such as: (i) covenants not to sue; (ii) assumption of risk/buyer beware/as-is clauses; (iii) limitation of liability; and/or (iv) indemnity. Alternatively, the BAIP platform's Terms of Service for bidders may contain such risk-reducing language.

For example, the musician might inadvertently touch upon the Beatles' song "Yesterday" in developing a new song asset which gets recorded in the live video feed. The musician may (or may not) realize the similarity. Either the auction participants in the chat window (during the auction) or the Melody ML (during or after the auction) will identify the potential copyright infringement. Melody ML can compare the pre-existing copyrighted song to the audio data, the video data, and/or the finished assets. In one embodiment, the BAIP platform identifies similar songs using a voice to text generator to identify and determine similarity of song lyrics within the audio data, video data and/or the finished asset to lyrics of a pre-existing copyrighted song. If a similarity (e.g., of the melody and/or lyrics) is detected and the similarity reaches or surpasses a similarity threshold (e.g. 50% similar), the BAIP platform can provide the musician with options on how to handle the inadvertent copyright infringement such as: (i) enable the musician to create a use license such as a sync license and/or mechanical license (or connect to the owner of the copyright to enable the musician to obtain a sync and/or mechanical license; (ii) delete the unlicensed, copyrighted audio from the video feed; or (iii) remove the video feed asset from the auction.

In one embodiment, pre-existing music copyright holders will have an account on the BAIP system which enables them to easily request sync licenses and offer mechanical licenses in the event that an asset-in-progress song may sound similar to an existing song. For example, the BAIP platform can obtain a non-exclusive right to grant mechanical and/or sync licenses to a song. Such a non-exclusive right can be granted transferred via a paper/electronic contract or a blockchain using a smart contract. Paper/digital contracts can be stored on the BAIP platform 1000. A reference to the smart contract proving ownership of those rights can be stored within the finished asset database 1004. A copy of the pre-existing copyrighted song can be stored within the finished asset database 1008.

An agreement to sign up with the BAIP platform as a copyright holder may include a clause by the copyright holder to agree in advance to: (i) arbitration should any new asset-in-progress be found to be similar to an existing song; and/or (ii) that any successful challenge to a song made on the BAIP platform will be settled through a secondary NFT as an amendment to the original song NFT—with damages being limited to a percentage of the song royalties. Limiting damages is one way to prevent people from making a business out of identifying copyright infringements.

Platform-standard smart contract code is unchangeable and meant to convey to the bidders that the platform is ensuring that the winning bidder is getting the rights they expect to get without being duped by a savvy asset creator.

Over the years, many musicians have been disappointed to find that the copyright holder (such as a publisher or a record label) of a song they wrote was using their song to promote a product that the musician wouldn't have supported themselves. For example, Paul McCartney was alleged to have been disappointed to discover that the Beatles' song "All You Need Is Love" was used to promote P&G's Luvs Diapers.

In FIG. 5, Asset 1 501 is comprised of a physical artwork, a .jpg file, and one video feed .mp4 file. After the auction, the asset creator can ship the physical artwork to the winning bidder.

The terms and smart contract code selected to describe of all of the rights, goods, and services to be auctioned shall be referred to as asset in progress data. Each asset in progress (e.g., a song, an artwork, a manuscript, or an idea) will be described in the auction as shown in FIG. 3, FIG. 4, and FIG. 5 with the detail explained in FIG. 6*b* and FIG. 7*b* so that the bidders are informed as to the assets on which they are bidding.

The rights, goods, and services transferred shall be referred to as finished assets. Finished assets include: video stream data; audio stream data; text data; graphical data; video data; audio data. The metadata describing the finished assets (which is usually determinable after the asset is created) shall be referred to as finished asset data.

As shown in FIG. 2, at step 203, the asset creator uses the BAIP platform to set the pricing parameters for each of the sub-assets. The pricing parameters are associated with the sub-assets and, as shown in FIG. 10, are stored in the auction data database 1005. Pricing parameters include traditional auction pricing such as a reserve price, a "buy now" price, an incremental price, and reserve price adjustment formula options (i.e., the conditions for lowering a reserve price). An example of a reserve price adjustment formula is: if there are no bids at 5 minutes into the auction, then automatically lower or remove the reserve price. Pricing parameters can be set for each asset. Pricing parameters can also include setting discount prices. For example, a bidder could get one of ten NFTs for one fixed price amount or 10 NFTs for a discounted fixed price per NFT.

As shown in FIG. 2, at step 204, the asset creator uses the BAIP platform to set the auction parameters. The auction parameters are associated with the sub-assets and, as shown in FIG. 10, are stored in the auction data database 1005. Auction parameters may include: an auction time duration; automatic auction time extension parameters; whether the bidders can pool their money to bid and fractionalize their ownership (explained below); whether the bidders can request additional assets; whether the bidders can chat with the asset creator during or after the auction (as shown in FIG. 5, chat button 502); whether the auction is fixed by the asset creator or whether the auction can change (for example, on request of the bidders with subsequent approval from the asset creator); or whether the asset creator is open to selling additional assets after the auction.

As shown in FIG. 2, at step 205, the asset creator initiates hosting of the auction on the BAIP platform which: (i) starts displaying, and preferably recording, the live audio and/or video feeds of one or more assets in progress; and (ii) opens the bidding. As shown in FIG. 3, FIG. 4, and FIG. 5, the bidder sees the following for Asset 1: the current bid ($500.00), the number of people watching the asset (10) 503, a text box to input a bid, a button to submit the bid, and a button to add the asset to the bidder's watchlist (interactive heart icon, 504), time left in the auction, parts of the world where each bidder resides (not shown).

As shown in FIG. 2, at step 206, the auction ends which stops display of the live audio and/or video feeds and closes the bidding.

As shown in FIG. 2, at step 207: (i) finished assets created on the BAIP platform (such as live video feeds) are can be automatically stored; and (ii) finished assets that are stored external to the BAIP platform such as a high-quality digital picture or audio files of the finished assets (1 can only be created by the asset creator after the asset is finished) are uploaded to the system and associated with the correct asset/sub-asset. As shown in FIG. 10, finished assets are stored in the finished asset database 1008. The sold finished assets can be made available to the winning bidders for viewing and/or download via: (i) the bidder's BAIP platform account; and/or (ii) a download link in an email sent to the winning bidders. The download link could be to a file stored on the InterPlanetary File system—a decentralized peer-to-peer network.

As shown in FIG. 2, at step 208, smart contracts are finalized. When the sub-assets are defined in step 202, copyright rights in the smart contract code are fixed. At the end of the auction, the BAIP system finalizes (before minting) the smart contract(s) with details that can include winning bidder, winning bid amount, asset title, song duration, lyrics, instrumentation, production, number of tracks, arrangement, music style, artwork colors, art medium, application medium, date of creation, location of creation, list of bidders, list of auction participants and watchers, and any other data related to the creation of the asset and associates the asset.

In the preferred embodiment, as shown in FIG. 2, at step 209, the BAIP system deploys smart contracts (e.g., NFTs) to the Ethereum blockchain and sends transactions to the smart contracts which transfers ownership of one or more winning assets (e.g., finished assets such as a song or assets such as a Zoom call) to the winning bidder(s). Alternatively, ownership could also be transferred using a traditional paper/digital contract. NFTs can be transferred to the winning bidder's Ethereum software wallet such as Metamask. NFTs can also be transferred on various Ethereum-based blockchains such as Polygon.

Figure 9:
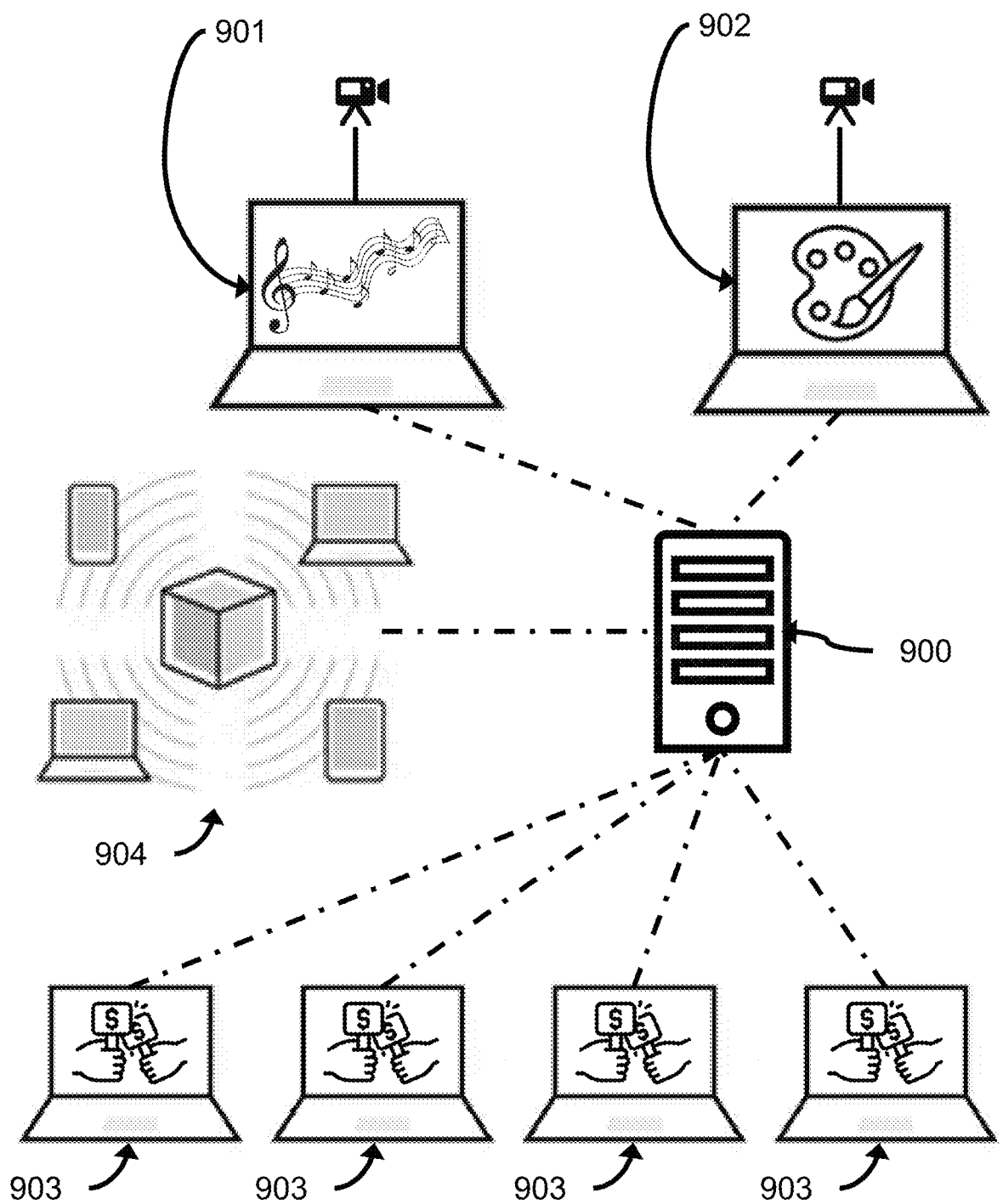
FIG. 9 shows the network arrangement of the various computing devices utilized by the invention.

Thus, as shown in FIG. 9, the BAIP system enables asset creators such as musicians (using their computing device 901) and artists (using their computing device 902) to auction finished assets (before or after they are finished) to bidders (using web browsers or applications on their computing devices 903) which are transferred using NFTs via the blockchain 904.

In one embodiment, the internals of the BAIP platform 1000 comprise: (i) a database for storing a plurality of asset creators 1003; (ii) a database for storing platform-standard and modified smart contract code 1004; (iii) a database comprising definition of assets and sub-assets, auction parameters, and pricing parameters 1005; (iv) a database of bidders 1006; (v) a database of generated GeoGnomo codes 1007; and (vi) a database of finished assets 1008. Asset creators and bidders use a browser or application on their computing device 1001 to interact with the BAIP platform 1000 by creating and displaying assets in progress and auctioning finished assets, ownership of which is transferred to winning bidders using NFTs via the blockchain 1002.

In one embodiment, bidders can interact with the asset creator before, during, or after the auction. For example, the auction could take place during a concert and the musician can take song requests before or during the concert. As another example, a bidder might want to contact the asset creator after the auction to purchase an asset not transferred during the auction or to request additional potential auction items such as a customized asset such as a "Happy Birthday" song. Often, asset creators will not be able to interact with bidders during an auction taking place during one of their concerts. An auction hosting service may provide services to interact with bidders or modify the auction while the auction/concert is in progress. In another example, the asset creator may create a preview of the auction by showing the assets/sub-assets it intends to auction. Bidders may contact the asset creator to suggest items to include prior to the auction.

In one embodiment, the auction can be modified during the auction. For example, if the original auction was for an MP3 of a new song created during the auction, the bidders/viewers of the auction can request the auction of another asset such as: (i) the video streamed during the auction; (ii) the copyright of the new song; or (iii) the musical instrument on which the song was composed. In another embodiment, if the asset creator needs additional time to complete the work, the asset creator may increase the auction duration. In another embodiment, in the event that the asset creator needs to halt the auction for any reason, the asset creator may terminate or pause the auction. In another embodiment, if there is at least one active bid, but the asset creator needs to terminate or pause the auction for any reason, the asset creator can be held responsible for completing the asset within a certain amount of time. The asset creator can contact the winning bidder to arrange for the completion of the asset. In such event, the bidder(s) may be able to retract their bids.

In one embodiment, a group of bidders can band to together to outbid another bidder. For example, if there are 5 bidders, a list of the 5 bidders would be shown with the highest bidder on top. All of the bidders will have an option to pool capital to purchase an asset. In one embodiment, an Option to Pool button (not shown) is selected by a bidder. In a fractionalized-ownership bidding interface, the bidder can select which bidders to include in a Request to Pool that will be sent to the selected bidders. If the option/invite is accepted, a chat window or video call can automatically be created to discuss the collective bidding strategy. As the auction will likely be time-limited, the quicker a decision can be made the better. This can be facilitated by each bidder, prior to the auction, filling in a short bio which may include data points which would suggest interests and past NFT purchases. In one embodiment, a bidder can opt to only see and collectively bid with other people that have certain matching desired attributes (e.g., private individuals, businesses). In another embodiment, the BAIP platform could suggest collectively bidding with other bidders that have similar interests (e.g., bidders that belong to the same Facebook or LinkedIn Groups). In another embodiment, the platform could suggest similar bidders with which to pool money.

In one embodiment, after the bidding group is formed, a Distributed Autonomous Organization (DAO) can be automatically created on behalf of the winning group of bidders to hold the asset making decisions affecting the asset. A DAO is a blockchain-based form of organization or company that is often governed by a crypto token. Anyone who purchases and holds these tokens gains the ability to vote on important matters directly related to the DAO. DAOs typically use smart contracts in place of traditional corporate structures to coordinate the efforts and resources of many towards common aims. These are self-executing computer programs that carry out a particular function when certain conditions are met. The name of the DAO can be automatically set as the asset name or can be decided during or after the auction. The DAO's registered agent, articles of organization, and EIN number can be preset by the platform to ensure a smooth process. After the DAO is created and the asset is transferred to the DAO, subsequent decisions with respect to the DAO and its assets can be managed or voted on by the DAO token holders. Alternatively, the DAO could be set up to be fully autonomous, such that it is only set up to distribute funds to the fractional owners according to the underlying smart contract.

In one embodiment, the winning bidder of the copyright can offer either mechanical and and/or synchronization licenses on the BAIP system. A self-service mechanical and synchronization license interface could be created so that anyone can pay a license fee as needed before performing, recording, or distributing a copyrighted song. This would lessen dependence on licensing entities such as the Harry Fox Agency.

In one embodiment, bidding can come via multiple websites/portals such as OpenSea, SuperRare, Rarible, Nifty Gateway, or auction house websites (such as Sotheby's or Christies). Application Programming Interfaces (APIs) can enable an auction to be broadcast through other websites into a common portal for viewing/bidding.

If an auction, supplemental to the original live auction is created, bidders from the original live auction can register to be notified of the supplemental auction. Examples of assets that could be included in a supplemental auction include: (i) an asset that didn't meet the reserve price; (ii) the LogicX project file; (iii) assets associated with the narrative created during the live auction; and (iv) assets associated with the losing artwork as shown in FIG. 4.

Similarly, a video feed may contain two versions of the same song. One bidder may like one version and another bidder might like the second version. Although the auction might be set up to only auction the final version, a supplementary auction may be set up to sell or auction the alternate version.

The BAIP platform can be used to analyze existing underlying copyright rights in NFTs or remember previous copyright rights granted such that overlapping grants may not be made on subsequent grants of the same work. For example, MusicianM created SongX on the BAIP platform and sold the exclusive, transferrable right to only use the song for birthday parties. Later, MusicianM wanted to grant the full copyright to BuyerB. The BAIP platform would identify the outstanding limited copyright grant and prevent the full copyright transfer to BuyerB. Thus, BuyerB would be notified that his grant would contain the full copyright less the previously granted right to use the song for birthday parties.

In order to encourage asset creation on the BAIP platform, all NFTs created on the BAIP platform could prevent the winning bidder from accusing the original asset creator of creating involuntarily or minimally similar works in the future. For example, NFTs created on the BAIP platform, by default, may limit the scope of any copyright grant by enabling the original asset creator to retain the ability to make, perform, and sell involuntarily or minimally similar derivative works and profit from those derivative works. As another example, NFTs, by default, may contain a covenant not to sue the original artist unless any of their subsequent works are substantially similar. In one embodiment, in order to prove whether something is involuntarily, minimally, or substantially similar, the BAIP platform can assemble a jury (for example, of musicians of similar NFT sales or similar followers or similar number of followers) to vote on the similarity. In another embodiment, GeoGnomo Codes (described above) can be compared to determine the degree of similarity.

When it comes to popular artists such as Elton John, Rihanna, Maroon 5, or Adele, a live auction for assets relating to a new song would likely draw millions of viewers. This would place a huge demand on auction web servers due to the number of simultaneous video streams. Therefore, video streams could be hosted on platforms such as Amazon Web Services that feed directly back to the auction website. Alternatively, auctions could be limited to a certain amount of pre-registered bidders.

Auctions can be private or limited to pre-qualified bidders in the event of an auction with a high reserve price. An example of a private auction could be an auction limited to only subscribed fans, not music publishers/record companies.

An artist/musician asset creator would preferably have the following equipment: (i) one or more web-enabled video/audio cameras; (ii) one or more displays to view the live bidding including their own work in progress; (iii) a phone/laptop/digital device that houses the software used for the creation of the asset; (iv) musical instruments and/or microphone; (v) lighting accessories; and (vi) audio/video recording/editing software.

In one embodiment the BAIP system can monitor the incoming video stream and provide input such as having poor lighting or audio/video quality and provide suggestions as to what areas need to be improved for the asset creator.

In order to comply with the intent of securities laws, fractional ownership would require that: (i) the assets and sub-assets are clearly defined; (ii) the final code (smart contract) to be associated with the finished asset is available for inspection; (iii) that the asset definitions match the final code; and (iv) a detailed background of the asset creator is provided so that the bidders can better valuate the asset.

In one embodiment, the present invention enables smart contracts for copyrightable works. In the preferred embodiment, when an asset creator creates a new work on the BAIP system, an NFT of the work is published on the blockchain. When anyone other than the artist attempts to transfer a work with that artist's name and title of work, Ethereum smart contract validators will be able to detect a match and prevent piracy (making illegal copies and not giving royalties to the proper owner). The validator can then validate the copyright ownership to help prevent copyright infringement lawsuits.

After a copyright right exists for a work on the blockchain, any subsequent work with the same title by the same artist can only be transferred by the current copyright holder. For example, MusicianX creates deploys as smart contract for the asset SongA and all of its copyright rights by MusicianX. MusicianX subsequently sells his full copyright of SongA to OwnerO and sends the transaction to the smart contract. FraudsterF creates a new smart contract for the asset: an MP3 with MusicianX as the artist and SongA as the title. As the new owner of the full copyright rights of SongA by MusicianX, the present invention would prevent the creation of any smart contract relating to SongA by MusicianX from anyone other than OwnerO. This embodiment could be implemented within the BAIP platform or, preferably, in a new token format that recognizes and requires specific metadata for copyrightable content. Not only would this invention prevent fraudulent transfers, it would also enable an easier mechanism for finding unauthorized copies. This embodiment would not analyze the content of a song/image to determine whether any part of the song/image would constitute an unauthorized copy. The present invention could also detect unauthorized copies if the new work title was similar. A machine learning algorithm could be taught to detect similar titles. If a full copyright was transferred (or just the right to create derivative works) to OwnerO, a title such as "Hey Jude feat. Musician," "HeyJude," "Jude Hey," or "Hay Jude" if the owner is not listed as OwnerO, the algorithm could detect a potential unauthorized derivative work.

In one embodiment the asset creator can categorize the assets/sub-assets before the auction if the asset creator has a particular genre in mind. For example, if an artist wants to create an auction around song creation, the artist could choose "Music" from a drop-down Asset menu, then "Jazz" from a drop-down Style menu. As another example, an artist might choose from drop down menus the following categorization: "Asset:Art," "Type:Painting," and "Style:Linear Impressionism." A writer might categorize an asset as: "Asset:Writing," "Medium:Book," "Genre:Horror." The auction platform can group types of auctions together so that someone wanting to review all assets in a particular category (e.g., all romantic screenplays) can do so easily. In another embodiment, the asset creator can categorize the assets/sub-assets after the assets are created. This categorization can become a part of the smart contract. For example, a screenplay titled, "My Tragic Love Life," could be categorized as follows—"Asset:Writing," "Medium:Screenplay," "Genre: Romantic Comedy." Thus, when a producer is looking to purchase a romantic comedy screenplay, the producer could easily go through the categories to find it—Writing—Screenplay—Romantic Comedy. Similarly, the categorization can be used to automatically create metatags in the smart contract which can be then used by a search engine to find that particular asset. Hashtags can also be created on a social media platform such as Twitter related directly to an asset to be auctioned off on the BAIP platform.

In one embodiment, the live video feeds can be different views of a single musician. Alternatively, when numerous musicians are performing, there can be one view or multiple views of each musician. Other video feeds can be of the software used for recording/editing the music or of displaying fine artists creating artwork to be associated with the final asset/sub-asset.

In one embodiment, the live performance can take place inside a metaverse, a virtual reality or augmented reality setting. For example, the artist or musician may be represented in a metaverse as an avatar. The avatar may perform in a virtual coffee shop or at a digital representation of a popular performance venue such as the Red Rocks Amphitheater. This enables the musician to: (i) set the mood for the music or the atmosphere where the musician believes the music to be appropriately set; and (ii) lessen the stage freight at performing live to potentially many people around the world.

Other assets can include a semi-fungible token such as a concert ticket (fungible within the same seating areas for example, general admission) that becomes a collectible (non-fungible token) or a lottery ticket (non-fungible token) after the concert. For example, ticket holders can be notified that their ticket will also act as a lottery ticket after the concert. A randomized automated lottery could distribute different assets/prizes to various concert tickets. Thus, the customized assets make the previously fungible general admission concert ticket, now, non-fungible.

In one embodiment, a bidder can suggest a new asset while the auction is on-going. The musician can approve or reject the suggestion. For example, a bidder can request a new asset be created to auction the musician's guitar used to create the asset.

These items could also become part of a supplemental auction or secondary market purchase.

There are many examples of what can be done with a live asset in progress auction in addition to a live auction for a new song or artwork as described above.

A live photography/video auction enables a photographer with an internet-enabled camera to automatically upload photos/videos to the BAIP system.

An architecture auction enables an architect to sell the copyrights to building designs as permitted under the Architectural Works Copyright Protection Act of 1990 while the design is in progress.

A song auction enables songwriters to perform live for music publishers to bid on the full or partial copyright of one or more of their songs.

A new food recipe auction enables a chef to include, for example, seven out of ten ingredients during the live auction with the remaining ingredients and/or steps to be included in an NFT.

A new (or unsigned) artist auction enables bidding on an artist/individual/group to be signed to a record label or music publisher. In one embodiment, a closed/sealed bid enables bidders to privately offer terms which the new artist can accept or reject. In one embodiment, for artists that have a public following and are known, the artist could offer desired contract terms. If these terms get bid on (accepted), these terms become the asset or the basis for a smart contract which can be further negotiated outside of the auction setting. In another embodiment, a new artist with little or no public following (e.g., social media presence) could create an auction where there are fields or checkboxes that give bidders high-level options to use as a basis for a future contract. In legal terms, this would be similar to a letter of intent where the parties agree to negotiate in advance a contract based on certain pre-agreed terms. The pre-agreed terms would be the asset and could comprise terms for a fine artist such as amount or type of publicity, types and frequency of auctions (if an auction house), and percentage share of royalties. In one embodiment, the BAIP platform could provide artists with pre-qualified bidders that are interested in finding new artists. This could be an automated process inviting bidders that match previously selected interests. In another embodiment, the purpose of the auction could be to fund the artist's next record or next tour in exchange for a percentage of earnings or future royalties. In another embodiment, the auction could be dynamic where there is no set asset, but a live video conference feed could enable parties to negotiate in real time and the asset could be created by the parties and shown in a shared window. In another embodiment, in order to participate in the new artist auction, before the auction, the artist would pre-agree to contracts (containing terms such as exclusivity, advance amount, who owns masters) from multiple record labels or music publishers. The auction would be to determine which, if any, contract would be countersigned. The agreement could either be paper-based or could be minted in a smart contract. In one embodiment, a negotiation period after the auction enables the parties to finalize details of the contract to create after-auction negotiated terms (which could be included in the NFT's metadata). A new artist auction can be used for any profession (e.g., modeling, acting, doctors, lawyers, engineers, etc.). In one embodiment, the potential employee and/or the employer can remain anonymous. In one embodiment, there can be pre-qualifications for the new artists such as a pre-determined size of a social media presence.

Publishers can also be producers, streaming services, record labels, or anyone interested in monetizing the song's value through its copyright. Publishers do many different things and their role is changing due to the rise of streaming services and blockchain automated activity. In another embodiment, when a song is being created, a producer/engineer can mix the song towards the finished product in real time. The producer/engineer could then be one of the asset creators decided ahead of time by the songwriter(s). The producer/engineer would then own a part of the copyright and royalty rights (according to the pre-determined agreement) that would be part of the song's final NFT profits distribution rights.

Other assets that can be auctioned in progress can include but not be limited to interior/exterior design plans and drawings, storyline ideas for musicals/TV/movies, choreography, sports training regimens, clothing design ideas, diet plans, new musical instrument design, and marketing ideas for specific products/services.

A tag-teaming asset auction enables two or more artists/musicians/creators to contribute to the creation of an asset with, for example, one creator to start the asset at the first time and subsequent creators to take over the development of the asset either separately or together. In this situation, video feeds would be staggered or simultaneous depending on how the auction is set up. The finished assets might include the collective or individual contributions of the various creators.

A relay auction would enable multiple artists/musicians to, one after another, add to an asset or create a set of assets. For example, one person finishes their contribution and another person/group adds to the asset (or creates a back-to-back asset).

A custom song auction would enable a bidder to request the creation of a new song such as a happy birthday song for their daughter, a customized Christmas song for a city, a brush your teeth song, or a prayer. Supplementary auctions could include further customization of the song's lyrics such as "Happy Birthday Maria"—a song created specifically for Maria on her birthday initially written for Sam.

A rolling auction is an auction that takes place over an extended period of time (days, weeks, etc.) where all the assets created by an individual (or group of people) during that time become part of the final assets that can either be broken into smaller assets or minted as a complete asset as described above.

Similarly, an asset in the auction could be for a new song and for a certain number of additional songs that the musician will create at a later time.

In one embodiment, the auction can be "invite-only" so that the contents of the auction are kept private. This could be used by (i) joint inventors to develop a new idea; (ii) joint collaborators to develop/create a new book/movie; or (iii) potential investors to discuss or develop a new product or idea. This can also be used for high-value assets. Accredited Investor and Know Your Customer (KYC) verification checks could be used to verify that the bidder had the requisite amount of capital. Anti-Money Laundering (AML) steps can also be taken to monitor and prevent illicit activity.

Secondary Additive/Subtractive NFTs

Secondary NFTs (or Derivative NFTs) can be created from the final/terminal artwork while the artwork is being created/constructed (additive NFT) or being deconstructed (subtractive NFT). Secondary NFTs can be tied to the final/terminal artwork within the smart contract of each of the NFTs such that it is possible to group secondary NFTs that are tied to each other by a database or centralized/decentralized ledger that can identify such characteristics. The artist can then opt to sell the secondary NFTs with or without the final/terminal NFT.

Artwork construction or deconstruction can be the artist playing a video or other creative representation of the creation of the artwork in forward or reverse respectively.

In one embodiment, when attendees are watching an artwork be created or deconstructed, the attendee may be provided with the option to create a secondary NFT at any moment. The attendee may then be provided with the option to suggest a name for that specific secondary NFT. Suggestions for naming could be provided by attendees for an artwork during its creation similar to playing the game Pictionary®.

Whether an NFT was created by an additive or substrative process can become metadata incorporated into the NFT's smart contract code.

Secondary NFTs can have rights independent of the final/terminal NFT and/or other secondary NFTs of the same artwork. Alternatively, the secondary NFTs and final/terminal NFTs can have interrelated rights. For example, each secondary NFT may carry with it the right to display the final/terminal NFT but not include monetization rights of the Final/Terminal NFT. In another example, the final/terminal NFT can display all of the secondary NFTs.

Generative Art—Artificial Intelligence—Based on Secondary NFTs

Generative art refers to art that, in whole or in part, has been created with the use of an autonomous system. An autonomous system in this context is generally one that is non-human and can independently determine features of an artwork that would otherwise require decisions made directly by the artist. Generative art often refers to algorithmic art (algorithmically determined computer generated artwork) and synthetic media (general term for any algorithmically-generated media), but artists can also make it using systems of chemistry, biology, mechanics and robotics, smart materials, manual randomization, mathematics, data mapping, symmetry, tiling, and more. Another type of generated art allows the artist or other people to change algorithmic variables to generate new art.

In one embodiment of the invention, datasets (images, for example) can be the asset sold in an auction. Alternatively, one or more generative artists could create new asset(s) based on one or more sets of underlying dataset assets (created with or without generative assistance). For example, one artist might create a dataset of different feet/shoes and another artist may create a set of bodies, heads, or accessories. A generative artist may select each of these datasets (with accompanying rights/royalties) to generate one or more assets. The generation of the assets can be created live. Each of the assets created from the underlying datasets can be auctioned off as a separate NFT or the generated assets can be auctioned as a group.

Furthermore, participants may have the option to control various variables within each dataset or to control how much of a dataset can be used for the final outputted asset.

Invest in a Person/Team

In one embodiment, a person can auction off their time, their future profits, their future ideas, or their future artwork in order to receive upfront value. For example, in order to afford school/college/graduate school tuition, a person may show people their academic/personal/sports talent in certain areas, or an artist can show a portfolio of past works and create an auction for their past or future work or future income written into the smart contract code of an NFT or a DAO. If a person auctions off a portion of their future earnings, that liability would be tied to the person's identity until a predetermined debt is fulfilled. Similar to how, at least currently, secondary royalty obligations are platform-dependent and must be individually written into the smart contract, identity can also be written into the smart contract. Identity can be the person's crypto wallet, to their mobile phone, to a digital identity, to a social security number, or to DNA data. Identity for a business can be tied to its publicly identifiable business registration.

In the case of tying future earnings to a person's identity, limit/rules can be placed on how the person's future earnings are transferred to the winning bidder. For example, the future earnings transferred may be capped at 10% per transaction up to a certain amount and 20% up to another amount; or a total amount (e.g., 10× multiple of the winning bid).

In one embodiment, similar to a scholarship, continued investment in a person can be tied to grades, qualifications, and/or financial need.

In another embodiment, an auction can be made for a team of people, each with an identity, or alternatively as a business entity as a group.

In another embodiment, the invention can be used to raise money for new ideas similar to the television show "Shark Tank" or "Dragon's Den." The assets can include the business, the invention, future inventions, and/or the team.

Having an online system for raising money enables contracts such as Non-Disclosure and Non-Compete Agreements to be in place before the auction begins. The system also enables a recorded list of all the participants/viewers of the auction. This enables inventors/creators the ability to ask for money earlier from investors that are willing to sign such agreements.

In another embodiment, once a prototype is made of an invention, the inventor can invite potential investors and/or buyers to an auction such that only one pitch is made and everyone interested can gauge others' interest levels. This is highly efficient for the inventor. The inventor can do one pitch, sell the idea (or get an investor), and move on with operating the business or move on to a new invention. As another example, an inventor can invite potential joint venture companies to a discussion about how the disparate companies can partner together to make something new. Joint ownership in a new entity can be set up through a DAO that holds the rights to the invention.

Think Tank—Joint Inventorship

In another embodiment, people can be gathered together to solve a problem online (in a private or public auction space). Ownership structure/rules could be agreed upon in advance to minimize conflict between inventors. At the same time as the problem is being solved and an invention being created, viewers of the auction can bid on the invention and/or the team as disclosed herein. Also, at the same time as the problem is being solved, manufacturers could bid on the option to manufacture the invention.

Various terms can be proposed for the team to consider. Also, at the same time as the problem is being solved, invention prior art researchers can be contributing to the invention by researching whether the solution already exists. Tokens in an eventual DAO are created or an ownership interest in the invention can be earned by such contributions. Other consultants can bid on the option to complete various tasks related to patenting, commercializing, testing, and developing the invention. One or more assets may be created such as: patentable ideas, trademark ideas, copyright ideas, a storyline, a prototype, software code, and a team created to commercialize the foregoing. The online environment enables text, drawings, audio, and video of the invention process to be recorded, stored, and optionally minted as NFT(s) whose specific ownership would be predetermined prior to or during the auction. This will enable the inventors/owners to prove inventorship, ownership, or authorship of the intellectual property.

Like standard setting organizations, people that gather together to solve a problem should be required to disclose all pre-existing interests so that other members of the group: (i) would be aware that a member could benefit from the group exploiting those pre-existing interests; and (ii) be able to discuss potential conflict of interest situations before getting involved.

In one embodiment, as the inventors are developing their idea, terms can be changed—if they realize that the eventual assets will be more or less valuable. This is similar to any entity raising money being able to turn down an offer for investment. The ability to change terms may depend on whether investors have signed non-disclosure/non-compete agreements.

In one embodiment the invention process may be spanned across multiple inventing sessions.

In another embodiment, the any part of the auctioning process may be done offline and the resultant winning bid/bidder and associated asset(s) can be transferred to the BAIP platform after the auction.

This invention, the BAIP platform, can be implemented in digital electronic circuitry, computer hardware, firmware, software, or in combinations thereof. The invention can be implemented as a computer program product such as a computer program tangibly embodied in an information carrier (e.g., in a machine readable storage device or in a propagated signal), for execution by, or to control the operation of, data processing apparatus (e.g., a programmable processor, a computer, or multiple computers). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Each computer includes a network interface, a processor, and memory. Example implementations of the computers include, but are not limited to, personal computers (PC), Macintosh computers, server computers, blade servers, workstations, laptop computers, kiosks, hand-held devices, such as a personal digital assistant (PDA), mobile phones, smartphones, tablets, and network terminals.

Method steps of the invention can be performed by one or more programmable processors executing a computer program to perform functions of the invention by operating on input data and generating output. Method steps can also be performed by, and apparatus of the invention can be implemented as, special purpose logic circuitry, such as an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, computer will also include, or be operatively coupled to receive data from or transfer data to, or both, one or more mass storage devices for storing data (e.g., magnetic, magneto optical disks, or optical disks). Information carriers suitable for embodying computer program instructions and data include all forms of non-volatile memory, including by way of example semiconductor memory devices (e.g., EPROM, EEPROM, and flash memory devices; magnetic disks such as internal hard disks or removable disks; magneto-optical disks; and CD ROM and DVD-ROM disks). The processor and the memory can be supplemented by, or incorporated in special purpose logic circuitry.

A network interface is in communication with the one or more databases (such as Oracle) for receiving data from the asset creator(s) and bidder(s) and transfers data to the winning bidders and the blockchain as shown in FIG. 9 and FIG. 10. The communication can be across a network (not shown), embodiments of which include, but are not limited to, local-area networks (LAN), metro-area networks (MAN), and wide-area networks (WAN), such as the Internet or World Wide Web.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein, including the best mode known to the inventors for practicing the claimed invention. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

In the event of inconsistent usages between this document and those documents so incorporated by reference, the usage in the incorporated reference(s) should be considered supplementary to that of this document; for irreconcilable inconsistencies, the usage in this document controls.

We claim:

1. A method, comprising:
receiving, using a network interface, fixed asset definition data for an asset, the asset to be auctioned in an online asset development auction;
before hosting the online asset development auction, storing, in a first memory, the fixed asset definition data such that the fixed asset definition data is un-editable;
hosting, using one or more servers, the online asset development auction, wherein the hosting comprises:
transmitting, to one or more bidder devices, at least some of the fixed asset definition data for the asset for display during the online asset development auction:
receiving, by at least one of the one or more servers, one or more of audio data and video data, wherein at least one of the audio data and video data captures the development of the asset from an unfinished state to a finished state;
receiving, by at least one of the one or more servers, during development of the asset, live, real-time bidding comprising one or more bids simultaneously on the asset as defined in the fixed asset definition data, wherein the received one or more bids comprise one or more winning bids; and
determining, using one or more processors, one or more winning bidders for asset based on the one or more winning bids;
after hosting the online asset development auction, storing, on at least one of the one or more servers, at least one of the audio data and video data:
generating, using at least one of the one or more processors, finished asset data for the asset;
creating, using at least one of the one or more processors, one or more electronic contracts for the asset based upon the fixed asset definition data and at least some of the finished asset data; and storing, in a second memory, the one or more electronic contracts, wherein the one or more electronic contracts transfer ownership of the asset to the one or more winning bidders.

2. The method of claim 1, wherein the fixed asset definition data comprises one or more of:
a description of a finished asset song;
a description of a finished asset artwork;
a description of intellectual property rights for the assets;
a description of a finished physical asset;
a description of a finished digital asset; and
a description of an finished asset.

3. The method of claim 2, wherein the asset is a contract, and wherein one or more of the fixed asset definition data and the finished asset data comprise one or more contract terms.

4. The method of claim 2, further comprising:
receiving, via a menu of copyright rights interface, the description of intellectual property rights for the asset.

5. The method of claim 1, further comprising:
receiving, by at least one of the one or more servers over a network, one or more of:
one or more pricing parameters; and
one or more auction parameters.

6. The method of claim 1, wherein the finished asset data comprises one or more of:
a finished asset title;
a finished asset song length;
a finished asset file size;
a finished asset physical size; a finished asset key;
a finished asset tempo; a finished asset style; a finished asset lyrics;
a finished asset hashtag;
a finished asset winning bidder;
a finished asset winning bid amount;
a finished asset materials used;
a finished asset categorization; a finished asset creation date;
a code representing a melody of a song;
a code representing a musical score of a song; and
a hash.

7. The method of claim 1, wherein the asset comprises one or more of:
a physical artwork;
a digital artwork;
a physical item;
a song;
intellectual property rights;
an electronic file;
video stream data;
audio stream data; text data; graphical data; video data; and audio data.

8. The method of claim 1, wherein the online asset development auction takes place within a metaverse.

9. The method of claim 1 wherein the asset is a song, the method further comprising
determining, using at least one of the one or more processors, a melodic similarity between a melody of the song and a melody of a second song.

10. The method of claim 1, further comprising:
providing a fractionalized bidding interface, the fractionalized bidding interface enabling at least two bidders to collectively bid on the asset.

11. The method of claim 10, wherein the fractionalized bidding interface comprises one or more of:
a chat option;
a video call option; and
an audio call option.

12. The method of claim 10, further comprising:
enabling creation of a distributed autonomous organization to manage ownership of the asset for at least two of the one or more winning bidders.

13. The method of claim 10, the method further comprising:
identifying, using at least one of the one or more processors, one or more of:
an interest similarity between a first interest of a first bidder and a second interest of a second bidder; and
a matching attribute between a desired attribute of the first bidder and an attribute of the second bidder; and
notifying, utilizing the fractionalized bidding interface, one or more of the first bidder and the second bidder of one or more of the interest similarity and the matching attribute.

14. The method of claim 10, further comprising:
receiving, by the network interface, a start time and a stop time of at least one of the audio data and the video data;
creating, by at least one of the one or more servers, a new asset related to a time period between at least the start time and the stop time.

15. The method of claim 1, wherein the asset is a dataset used in generative art.

16. The method of claim 1, wherein the asset is one or more of:
a person;
a team; and
a business.

17. The method of claim 1, wherein the fixed asset definition data comprises a description of intellectual property rights for the asset, the method further comprising:
displaying a licensing interface, the licensing interface configured to enable at least one of the one or more winning bidders to grant one or more licenses for the asset.

18. A system, comprising:
a network interface, the network interface configured to receive fixed asset definition data for an asset, the asset to be auctioned in an online asset development auction;
a memory, the memory configured to store the fixed asset definition data such that the fixed asset definition data is un-editable once the online asset development auction begins;
one or more servers, at least one of the one or more servers configured to host the online asset development auction, to receive one or more of audio data and video data, and to cause at least some of the fixed asset definition data for the asset to be displayed during the online asset development auction; and
wherein at least the one of the received audio data and video data captures the development of the asset from an unfinished state to a finished state;
the one or more servers configured to:
receive, during development of the asset, live, real-time bidding simultaneously on the asset as defined in the fixed asset definition data, wherein the one or more bids comprising one or more winning bids; and
determine one or more winning bidders for the asset based on the received one or more winning bids;
generate finished asset data for the asset;

create one or more electronic contracts for the asset based upon the fixed asset definition data and at least some of the finished asset data; and store, in a second memory, the one or more electronic contracts, wherein the one or more electronic contracts transfer ownership of the asset to the one or more winning bidders.

19. The system of claim 18, wherein the fixed asset definition data comprises one or more of:
a description of a finished asset song;
a description of a finished asset artwork;
a description of intellectual property rights for the asset;
a description of a finished physical asset; a description of a finished digital asset; and
a description of an asset.

20. The system of claim 19, wherein the asset is a contract, and wherein one or more of the fixed asset definition data and the finished asset data comprise one or more contract terms.

21. The system of claim 19, further comprising:
a menu of copyright rights interface, the menu of copyrights rights interface configured to receive the description of intellectual property rights for the asset.

22. The system of claim 18, further comprising:
receiving, by at least one of the one or more servers over a network, one or more of:
one or more pricing parameters; and
one or more auction parameters.

23. The system of claim 18, wherein the finished asset data comprises one or more of:
a finished asset title;
a finished asset song length;
a finished asset file size;
a finished asset physical size; a finished asset key;
a finished asset tempo; a finished asset style; a finished asset lyrics;
a finished asset hashtag;
a finished asset winning bidder;
a finished asset winning bid amount;
a finished asset materials used;
a finished asset categorization; a finished asset creation date;
a code representing a melody of a song;
a code representing a musical score of a song;
and a hash.

24. The system of claim 18, wherein the asset comprises one or more of:
a physical artwork;
a digital artwork;
a physical item;
a song;
intellectual property rights;
an electronic file;
video stream data;
audio stream data; text data; graphical data; video data; and audio data.

25. The system of claim 18, wherein the online asset development auction takes place within a metaverse.

26. The system of claim 18, wherein the asset is a song, and wherein at least one of the one or more processors is configured to determine a melodic similarity between a melody of the song and a melody of a second song.

27. The system of claim 18, further comprising:
a fractionalized bidding interface, the fractionalized bidding interface configured to enable at least two bidders to collectively bid on the asset.

28. The system of claim 27, wherein the fractionalized bidding interface comprises one or more of:
a chat option;
a video call option; and
an audio call option.

29. The system of claim 27, wherein the fractionalized bidding interface enables the creation of a distributed autonomous organization, the distributed autonomous organization configured to manage ownership of the asset for at least two of the one or more winning bidders.

30. The system of claim 27, wherein at least one of the one or more processors is configured to identify one or more of:
an interest similarity between a first interest of a first bidder and a second interest of a second bidder; and
a matching attribute between a desired attribute of the first bidder and an attribute of the second bidder; and
configured to notify, utilizing the fractionalized bidding interface, one or more of the first bidder and the second bidder of one or more of the interest similarity and the matching attribute.

31. The system of claim 18, wherein at least one of the one or more servers is configured to receive a start time and a stop time of at least one of the audio data and the video data; and configured to create a new finished asset related to a time period between at least the start time and the stop time, wherein the new finished asset is one of the one or more finished assets.

32. The system of claim 18, wherein the asset is one or more of:
a person;
a team; and
a business.

33. The system of claim 18, wherein the fixed asset definition data comprises a description of intellectual property rights for the asset, the method further comprising:
a licensing interface, the licensing interface configured to enable at least one of the one or more winning bidders to grant licenses for the asset.

34. The system of claim 18, wherein the asset is a dataset used in generative art.

35. The method of claim 1, wherein the fixed asset definition data is entered using a copyright rights template interface.

36. The method of claim 1, wherein the asset is a song, and wherein the fixed asset definition data specifies one or more criteria for determining which portion of the video data defines a version of the song to be auctioned, the criteria comprising at least one of:
(i) the last version of the song performed during the online asset development auction;
(ii) any version of the song performed during the online asset development auction; or
(iii) a specific time range of the online asset development auction.

37. The system of claim 18, wherein the fixed asset definition data is entered using a copyright rights template interface.

38. The system of claim 18, wherein the asset is a song, and wherein the fixed asset definition data specifies one or more criteria for determining which portion of the video data defines a version of the song to be auctioned, the criteria comprising at least one of:
(i) the last version of the song performed during the online asset development auction;

(ii) any version of the song performed during the online asset development auction; or
(iii) a specific time range of the online asset development auction.

\* \* \* \* \*